July 14, 1959 G. B. HATCHER 2,894,432
CARTON ERECTING MACHINE
Filed May 2, 1957 7 Sheets-Sheet 1

INVENTOR.
GLENN B. HATCHER
BY
Cumpston + Shaw
HIS ATTORNEYS.

July 14, 1959　　　G. B. HATCHER　　　2,894,432
CARTON ERECTING MACHINE

Filed May 2, 1957　　　　　　　　　7 Sheets-Sheet 5

INVENTOR,
GLENN B. HATCHER
BY
Cumpston & Shaw
HIS ATTORNEYS.

July 14, 1959

G. B. HATCHER 2,894,432

CARTON ERECTING MACHINE

Filed May 2, 1957

INVENTOR,
GLENN B. HATCHER
BY
Cumpston & Shaw
HIS ATTORNEYS.

United States Patent Office 2,894,432
Patented July 14, 1959

2,894,432

CARTON ERECTING MACHINE

Glenn B. Hatcher, Tulsa, Okla., assignor to Bloomer Bros. Company, Newark, N.Y., a corporation of New York Application May 2, 1957, Serial No. 656,656

11 Claims. (Cl. 93—37)

This invention relates to machines for automatically erecting collapsed cellular cartons, such as egg boxes of the type having collapsible walls and transverse cell-forming partitions, one object of this invention being the provision of a more practical machine of this type.

Egg cartons of the type referred to are usually stored and shipped in collapsed condition and require erection prior to use. The manual erection of such cartons is an expensive, tedious and time-consuming procedure, particularly where a large volume of cartons is handled. For this reason, it is desirable that this step be performed by an automatic mechanical device which will erect the outer walls of the carton and set up the inner dividing partitions, and the provision of such a machine is another object of this invention.

A further object of this invention is the provision of a machine having means for holding a large number of collapsed cartons and which will automatically erect and deliver the cartons to packers ready for filling.

In order to facilitate the filling of such cartons, it is desirable to provide the operator with a constantly replenished supply of erected cartons as rapidly as they can be filled. For this reason it is desirable to provide an automatic machine which will constantly maintain a supply of erected cartons and will replace the same as rapidly as they are used, and the provision of such a machine is another object of this invention.

Another object of this invention is the provision of a relatively simple hand-operated machine suited for users of small quantities of cartons.

Another object of this invention is the provision of a machine of the character described having simple straight line motion of the operating parts for performing the feeding, erecting and ejecting operations.

Other objects include the provision of machines of the character described and having the above advantages which are capable of economical quantity manufacture, and which may be readily assembled and maintained in operation.

To these and other ends the invention resides in certain improvements and combinations of parts, all as will be hereinafter more fully described, the novel features being pointed out in the claims at the end of the specification.

The machines embodying the present invention, and herein described for purposes of illustration, are particularly adapted for the erection of collapsed cellular cartons of the type commonly used for packaging eggs. Such a carton is illustrated in erected position in Fig. 8, and comprises a front wall 30, a pair of bottom walls 32 and 34 foldably attached to a longitudinal center partition 36, a back wall 38, and a closure wall 40. A cover wall 42 extends between front wall 30 and back wall 38, and is transversely slit to form a multiplicity of flaps 44 adapted to be swung downwardly for forming a plurality of transverse partitions to divide the carton into a plurality of cells 46.

A machine embodying the present invention may be broadly described as comprising a carton-containing hopper mounted on a base for reciprocating straight line motion, an erecting head, and means for removing the carton from the hopper and forcing it against the erecting head for erection. A stack of collapsed cartons is placed in the hopper, and the hopper is caused to reciprocate forwardly and backwardly over the erecting head. As the hopper moves forwardly, the lowermost carton catches on the erecting head, and its withdrawn from the hopper during the latter's rearward motion. During this motion, other parts of the machine serve to force the carton against the upper portions of the erecting head. Other parts move the bottom portions of the carton downwardly and rearwardly against the lower portions of the erecting head in order to complete the erection of the walls of the carton, and to swing the partitions into place to form the cells. When the hopper again moves forwardly, still other parts grip the erected carton and move the same forwardly away from the erecting head to eject the same.

Figure 1:
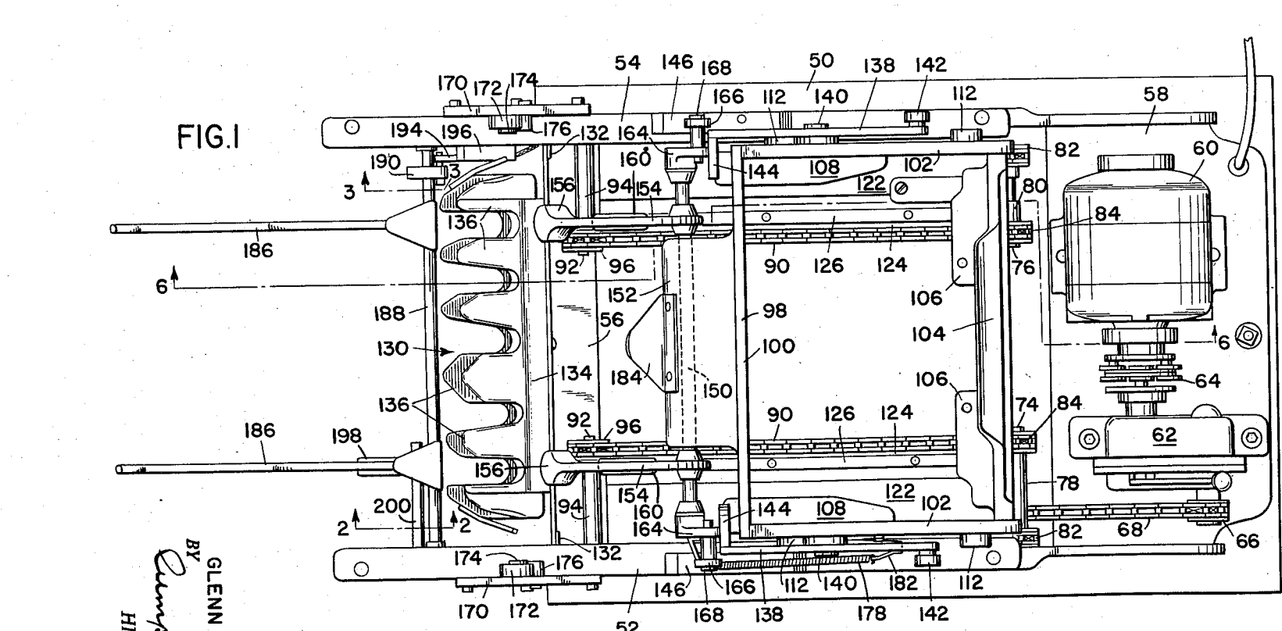
Fig. 1 is a top plan view of a machine embodying this invention.

Referring now to Fig. 1, a machine embodying this invention preferably includes a frame mounted on a base 50 and comprising two elongated side members 52 and 54 connected by a pair of transverse members 56 and 58. An electric motor 60 is mounted on transverse member 58 between the rear portions of side members 52 and 54. Motor 60 is connected to a variable speed reducer 62 through a flexible coupling 64. A sprocket 66 carrying a chain 68, is mounted on the output shaft of speed reducer 62, and drives a sprocket 70 (Fig. 5) mounted on a shaft 72 (Figs. 4 and 5) which is mounted in bearings in side members 52 and 54.

A pair of short inwardly extending stationary shafts 74 and 76 (Figs. 1 and 4) are rigidly mounted in side members 52 and 54, substantially above shaft 72. Idler shafts 74 and 76 carry rotatable elongated bushings (Fig. 1) 78 and 80, respectively. Bushings 78 and 80 each carry an outer sprocket 82 and an inner sprocket 84. Bushings 78 and 80 are driven by outer sprockets 82 through a pair of chains 86 (Figs. 4 and 5) running on sprockets 88 on shaft 72.

A second pair of inwardly extending fixed shafts 92 (Figs. 1 and 4) are mounted adjacent the front of side members 52 and 54 and parallel to and in line with fixed shafts 74 and 76. Each of these fixed shafts carries a rotatable bushing 94 having a sprocket 96. A pair of sprocket chains 90 run over the inner sprockets 84 on bushings 78 and 80 and over sprockets 96 on bushings 94, for purposes hereinafter described.

A hopper 98 (Fig. 4) adapted for holding a stack of collapsible cartons is movably mounted on side members 52 and 54. Hopper 98 comprises a front wall 100, two side walls 102 tapering downwardly towards the rear, and a rear wall 104. A pair of inwardly extending, horizontal flanges 106 (Fig. 1) are attached to the bottom of rear wall 104, adjacent the sides thereof, and a second pair of flanges 108 extend inwardly from the front portion of side walls 102. Sides walls 102 extend downwardly below front wall 100, and flanges 108 extend forwardly under the lower edge of wall 100, leaving a gap therebetween, as shown at 110 in Fig. 6. Flanges 106 and 108 together form the means for supporting a stack of collapsed cartons in hopper 98.

Hopper 98 is supported on flanged, anti-friction rollers 112 mounted on studs 114 on side walls 102. Rollers 112 roll on the flat top surfaces of side members 52 and 54, so that the entire hopper is free to reciprocate forwardly and backwardly as hereinafter described. A pair of angle brackets 116 (Fig. 5) fastened to walls 102 bear against the underside of a shoulder on members 52 for preventing upward movement of hopper 98.

A rod 118 is mounted between chains 90 and engages a pair of downwardly extending U-shaped brackets 120 (Figs. 5 and 7) mounted on rear wall 104 and flanges 106. When chains 90 are driven, rod 118 is moved forwardly, downwardly, rearwardly and then upwardly as the chains roll over sprockets 84 and 96. This reciprocating motion is transferred to hopper 98 through brackets 120 causing the hopper to move forwardly and backwardly during the erecting cycle as hereinafter described.

A pair of longitudinal, inwardly extending horizontal plate members 122 (Figs. 1 and 5) are attached to side members 52 and 54 under hopper 98. Members 122 carry tracks 124 for supporting chain 90 and a pair of raised rails 126 for providing additional support for the cartons in hopper 98.

Figure 6:
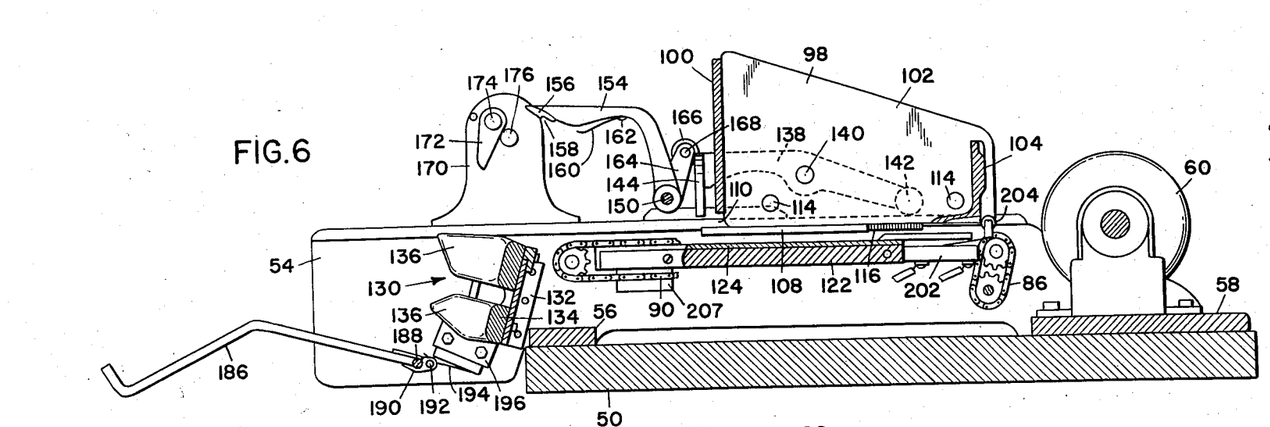
Fig. 6 is a cross sectional view taken substantially along lines 6—6 of Fig. 1.

An erecting head shown generally at 130 Figs. 1 and 6 is mounted on brackets 132 between side members 52 and 54 adjacent the front of the machine. Erecting head 130 comprises a body portion 134 and a plurality of outwardly extending finger portions 136. The ends of finger portions 136 are shaped to form cam surfaces for guiding the walls of the carton as hereinafter described during the erecting cycle and for entering the cells of the carton for folding the dividing partitions downwardly into erected position.

Figure 7:
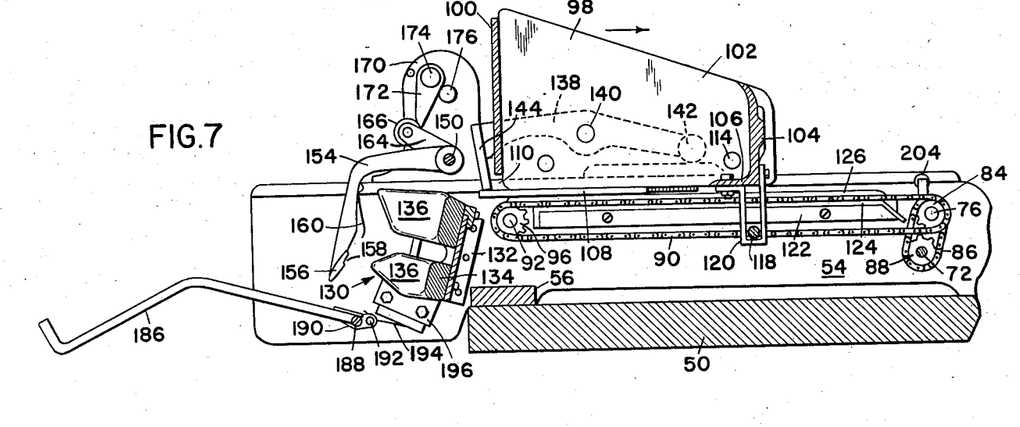
Fig. 7 is a fragmentary cross sectional view similar to Fig. 6 showing the hopper during its rearward motion.

A pair of arms 138 (Figs. 1 and 4) are pivotally mounted on studs 140 on side walls 102 of hopper 98. One end of arms 128 carries rollers 142 which ride on the flat upper portions of side members 52 and 54. The other ends of arms 138 are bent inwardly and thence downwardly and terminate in downwardly extending gripping portions 144 (Fig. 6) directly above and in position to engage the forwardmost part of flanges 108 which extend forwardly beyond front wall 100 of hopper 98 as described above. A pair of trapezoidal cams 146 (Figs. 1 and 4) are fastened to the upper surfaces of side members in a position to be engaged by rollers 142 during the reciprocating motion of hopper 98. When rollers 142 ride up onto cams 146, the gripping portions 144 of arms 138 are forced downwardly into contact with flanges 108, as shown in Fig. 7, for purposes hereinafter explained.

Figure 4:
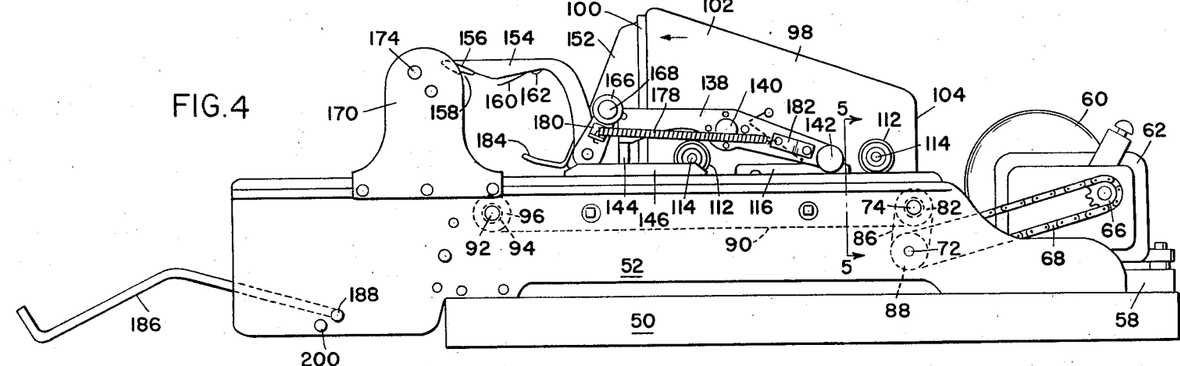
Fig. 4 is a side elevational view of the machine of Fig. 1.
Figure 5:
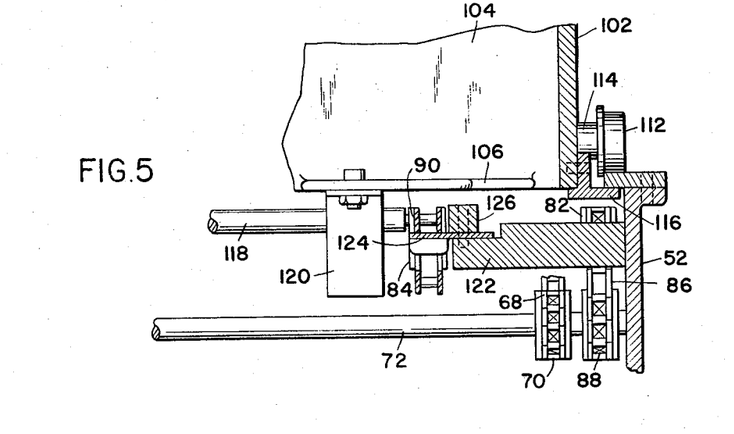
Fig. 5 is an enlarged fragmentary cross sectional view taken substantially along lines 5—5 of Fig. 4.

A transverse shaft 150 is rotatably mounted in an extension 152 on front wall 100 of hopper 98. Shaft 150 carries a pair of upwardly and forwardly extending arms 154 terminating in a flat portion 156 having a sharp edged shoulder 158 (Fig. 4). A short leaf spring 160 is fastened to the under side of arms 154 by means of a screw 162. The outer ends of shafts 150 carry rigidly mounted crank arms 164 terminating in a roller 166 rotatably mounted on a stud 168. A pair of upwardly extending plates 170 are fastened to the outer surfaces of side members 52 and 54 and carry a pair of pawls 172 (Figs. 1 and 6) pivotally mounted on studs 174 which extend into the path of rollers 166. A pair of abutments 176 are rigidly mounted on plates 170 directly behind pawls 172 in position to prevent the same from rotating rearwardly. As hopper 98 moves forwardly, rollers 166 engage pawls 172 and move the same forwardly and upwardly out of the way. Pawls 172 then fall back to their initial position against abutments 176 after rollers 166 have passed on their forward motion. However, when rollers 166 engage pawls 172 during the rearward motion of hopper 98, the pawls cannot pivot rearwardly because of abutments 176. For this reason, rollers 166 cannot move rearwardly along with hopper 98. As the hopper continues to move rearwardly, rollers 166 are forced downwardly and forwardly relative to the hopper by pawls 172 causing shaft 150 to rotate in a counterclockwise direction as viewed in Fig. 7, bringing the ends of arms 154 downwardly and rearwardly into substantial engagement with erecting head 130 for purposes hereafter described. A spring 178 (Figs. 1 and 4) connected to a bracket 180 (Fig. 4) on crank arm 164 and to a bracket 182 on arm 138 serves the dual purposes of resiliently urging crank 164 to its rearwardmost position and holding rollers 142 in contact with the upper surface of side members 52 and 54.

Figures 8, 9:
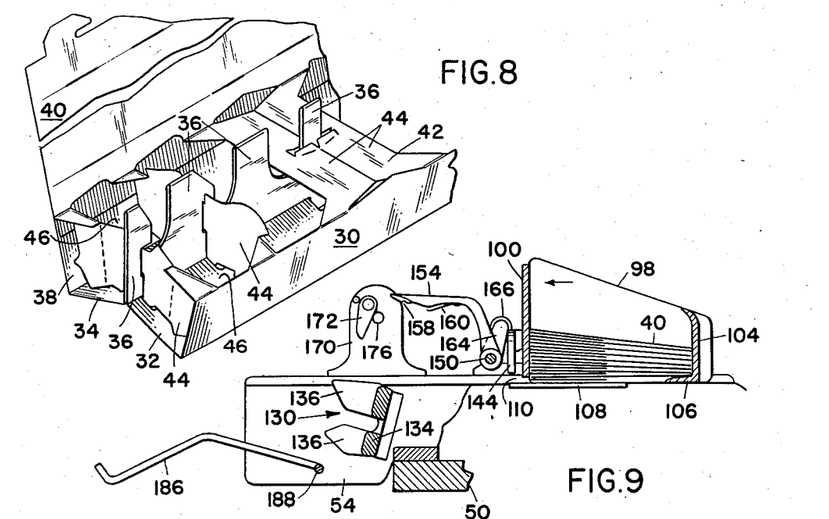
Fig. 8 is an enlarged perspective view of a partially erected carton suitable for use with the machine embodying this invention.
Fig. 9 is a reduced fragmentary cross sectional view illustrating the position of the machine at the beginning of an erecting cycle.
Figure 10:
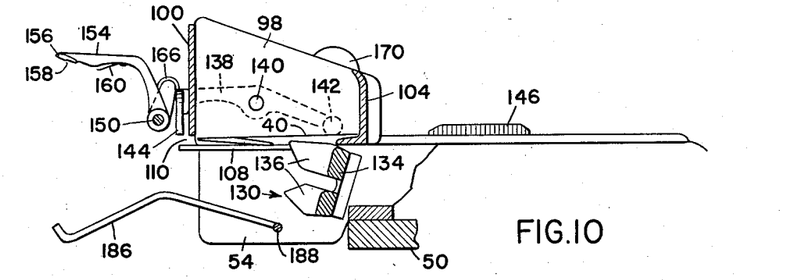
Fig. 10 is a view similar to Fig. 9 showing the machine with the hopper in its forwardmost position.
Figure 11:
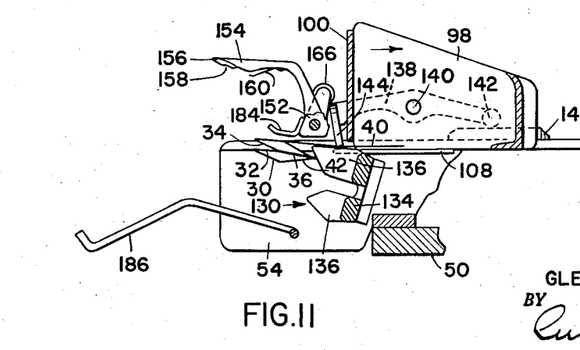
Fig. 11 is a view similar to Fig. 10 showing the machine with the hopper during the beginning of its rearward motion.

In operation, a stack of collapsed cartons is placed in hopper 98, as shown in Fig. 9. The lowermost carton of this stack rests on flanges 106 and 108 attached to hopper 98. When motor 60 is started, chains 90 and rod 118 move hopper 98 forwardly over the upper fingers 136 of erecting head 130 as shown in Fig. 10. When rod 118 moves downwardly around sprockets 96 and starts on its rearward journey, hopper 98 begins to move to the rear. However, the edge of the lowermost carton (formed by the intersection of the top wall 42 and center partition 36) catches on fingers 136, and thus remains stationary while the hopper moves rearwardly away from it. This causes the carton to slide partially out of hopper 98 through gap 110 between the lower edge of front wall 100 and flange 108 and to remain with the top edge of center partition 36 caught against fingers 136 as shown in Fig. 11.

As hopper 98 continues its rearward movement, rollers 142 roll upwardly on cams 146 causing gripping portions 144 of arms 138 to move downwardly to clamp closure wall 40 of the carton tightly against flange 108 on hopper 98. Since the hopper is moving rearwardly at this time, this pulls the carton rearwardly against fingers 136. Since the surfaces of fingers 136 are beveled downwardly, this rearward motion causes the center partition 36 to slide downwardly over fingers 136 as illustrated in Fig. 11, initiating the erecting action. The carton is prevented from bowing upwardly by a forwardly projecting flange 184 (Figs. 1, 11 and 12) fastened to extension 152 on front wall 100.

Further rearward movement of hopper 98 brings rollers 166 into contact with pawls 172. This causes shaft 150 to pivot in counterclockwise direction, as viewed in Fig. 12, moving the ends 156 of arms 154 downwardly against the bottom of the carton, forcing it against the erecting head. Shoulder 158 catches the corner of the carton at the fold line between the bottom wall 32 and front wall 30, forcing the front part of the carton against fingers 136, and leaf springs 160 force the center partition 36 up into the space between the upper and lower rows of fingers. At the same time, the continued rearward motion of the hopper pulls the rear portion of the carton firmly against the upper row of fingers.

Figure 12:
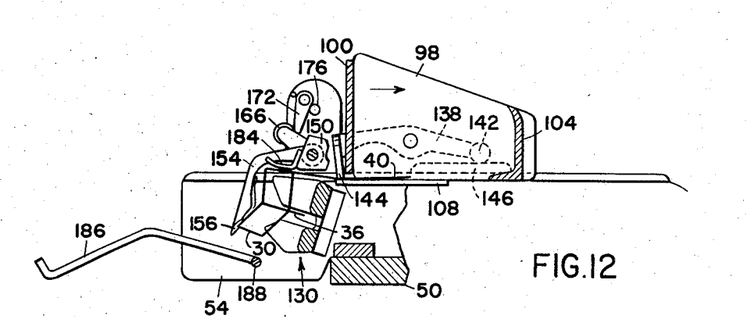
Fig. 12 is a view similar to Fig. 11 showing the machine with the hopper during its rearward motion.

As the carton is forced against erecting head 130, the horizontal bevel of the ends of fingers 136 swing flaps 44 of top wall 42 towards the bottom walls 32 and 34 into erected position to form cells 46. The carton is now completely erected.

Further rearward movement of hopper 98 causes rollers 142 to roll off cam 146 allowing arms 138 to return to normal position and releasing the carton. At the same time, roller 166 passes under pawl 172 and spring 178 returns shaft 150 and arms 154 to their initial positions. Hopper 98 then clears the erected carton, and the stack of collapsed cartons moves downwardly in the hopper to bring another carton into position for erection.

Figure 13:
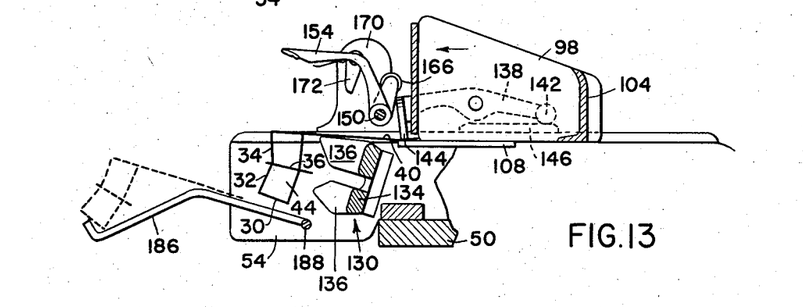
Fig. 13 is a view similar to Fig. 12 showing the machine during the ejection of the erected carton.
Figure 14:
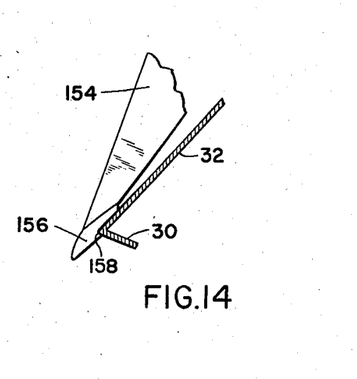
Fig. 14 is an enlarged fragmentary view of the end of the erecting arm.

As rod 118 rides over the sprockets 84 and starts its forward motion, the hopper again moves forwardly. As this happens, roller 142 rides up on cam 146 causing portion 144 of arm 138 to grip closure wall 40 of the erected carton as shown in Fig. 13. As the hopper continues to move forwardly, it carries the erected carton along, removing it from erecting head 130. When rollers 142 roll off cam 146, arms 138 return to their normal position, releasing the carton, which falls off the front of the machine.

Figure 2:
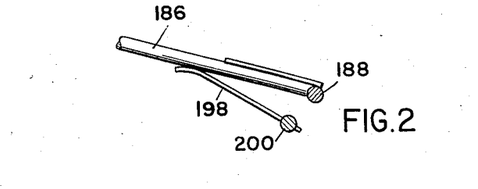
Fig. 2 is an enlarged fragmentary cross sectional view taken substantially along lines 2—2 of 1.
Figure 3:
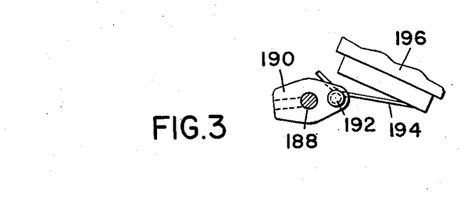
Fig. 3 is an enlarged fragmentary cross sectional view taken substantially along lines 3—3 of Fig. 1.

The erected carton falls on a pair of arms 186 (as shown in dotted lines in Fig. 13) which are attached to a shaft 188 (Fig. 1) which is pivotally mounted in side walls 52 and 54. A short arm 190 (Fig. 3) is rigidly attached to one end of shaft 188, and carries an abutment 192. Abutment 192 is in contact with the actuating arm 194 of a spring loaded switch 196 mounted on side member 54 adjacent the front of the machine. Arms 186 are urged resiliently upwardly by a spring 198 (Figs. 1 and 2) supported on a stud 200 on side member 52. The force exerted by spring 198 is sufficient to counterbalance the weight of arms 186 to prevent abutment 192 from contacting switch 196. However, the weight of an opened carton resting on arms 186 is sufficient to overcome the upward force of spring 198, causing limited rotation of shaft 188 to bring abutment 192 into contact with switch 196. Switch 196 partially controls the flow of power to motor 60, as hereinafter described.

A second spring loaded switch 202 (Fig. 6) having an actuating part 204 is mounted adjacent to the rear of the machine, in a position to be actuated by rear wall 104 of hopper 98 at the rearmost portion of its movement. When hopper 98 reaches its rearmost position, the lower part of rear wall 104 engages part 204, opening switch 202, for purposes explained below.

Figure 15:
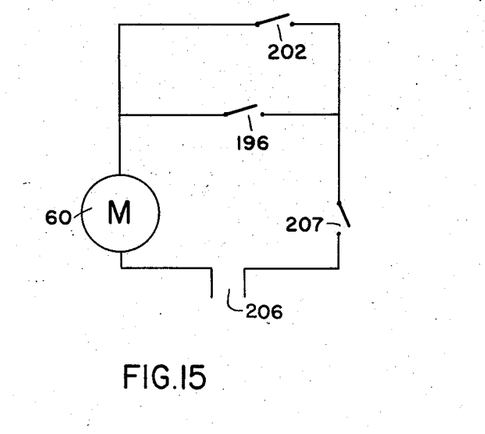
Fig. 15 is a schematic circuit diagram showing the electrical connections of the machine.
Figure 16:
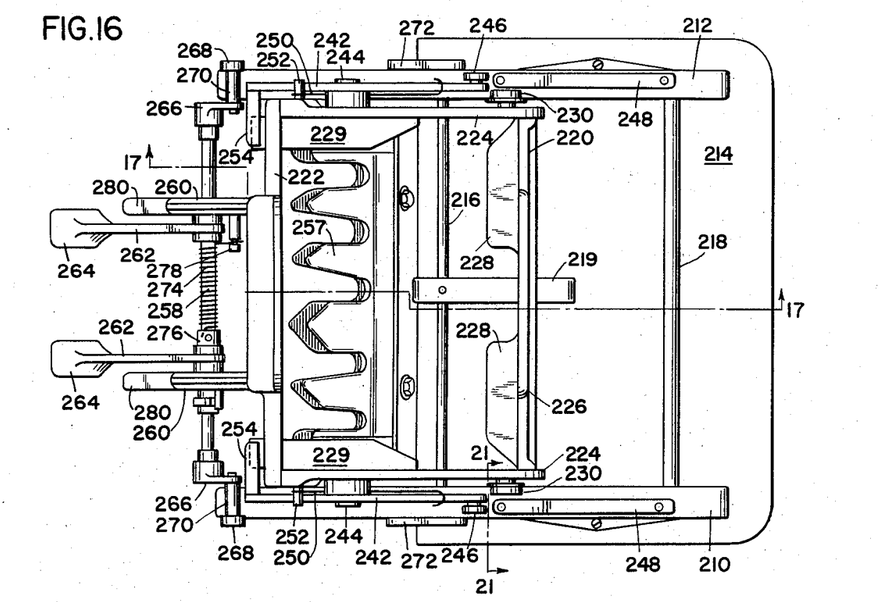
Fig. 16 is a top plan view of a second embodiment of this invention.
Figures 17, 18:
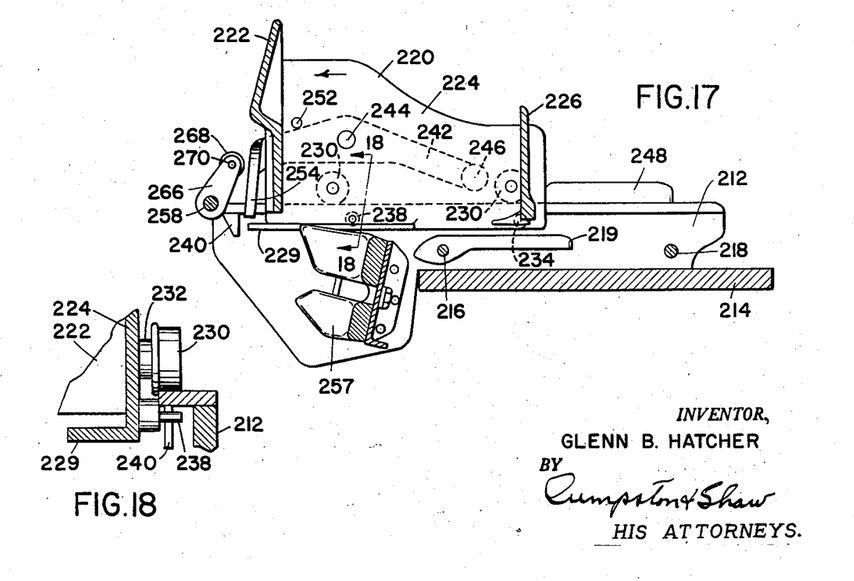
Fig. 17 is a cross sectional view taken substantially along lines 17—17 of Fig. 16.
Fig. 18 is an enlarged fragmentary cross sectional view along lines 18—18 of Fig. 17.

The electrical circuit controlling motor 60 is illustrated in Fig. 15. Motor 60 is connected to a standard power source 206 which is controlled by a master switch 207 mounted on one of the side members. The power of motor 60 is also controlled by switches 196 and 202 which are connected in parallel so that the motor will be energized if either of these switches is closed. When the weight of an erected carton resting on arms 186 causes switch 196 to be opened as described above, current will flow through switch 202 maintaining the motor circuit, and the motor will continue to run moving hopper 98 to the rear. When hopper 98 reaches its rearwardmost position, it engages switch 202 as described above, opening the same. If an erected carton remains on arms 186 when the hopper reaches its rearwardmost position, both switches 196 and 202 are open, and motor 60 will be de-energized, and hopper 98 will stop in its rearwardmost position. However, if the erected carton is removed by the operator before hopper 98 opens switch 202, switch 196 will close and the machine will continue to run through another cycle to erect a carton. Thus, it can be seen that the machine will maintain a constant supply of erected cartons on arms 186, and will automatically start to erect another carton as soon as the erected carton on arms 186 is removed by the operator.

A modified embodiment of this invention is illustrated in Figs. 16 to 21, inclusive. This machine is similar to the one described above, but is hand operated and therefore does not embody the motor and chain drive means described above.

This machine includes a frame comprising a pair of horizontal side members 210 and 212 mounted on a base 214, and maintained in parallel alignment by cross members 216 and 218. A longitudinally extending member 219 (Figs. 16 and 17) is supported midway between side members 210 and 212 by cross member 216 for purposes hereinafter described. A hopper 220 (Fig. 19) similar to hopper 98 in the first described embodiment is slidably mounted on side members 212 and 210.

Hopper 220 comprises front wall 222 (Fig. 16), a pair of side walls 224 and a rear wall 226. A pair of inwardly extending flanges 228 are fastened to the lower edge of rear wall 226 and a second pair of inwardly extending flanges 229 are fastened to the front bottom portions of side walls 224 and extend under front wall 222. These flanges, together with member 219, serve to support a stack of collapsed cartons in the hopper.

Hopper 220 is supported by flanged rollers 230 (Figs. 16 and 21) rotatably mounted on studs 232 on side walls 224. Rollers 230 roll on the flat upper surfaces of side members 210 and 212. A second set of smaller rollers 234 (Fig. 21) are rotatably mounted on studs 236 below rollers 230, and engage the under side of the upper surface of side members 210 and 212 for preventing upward movement of the hopper. Forward movement of the hopper is limited by a pair of studs 238 (Figs. 18 and 19) which engage a pair of stops 240 mounted adjacent to the front ends of side members 210 and 212.

A pair of arms 242 (Figs. 16 and 19) are rotatably mounted on a pair of studs 244 attached to and extending outwardly from side walls 224 of hopper 220. One end of arms 242 carries rollers 246 which are adapted to engage a pair of cams 248 mounted on the flat upper portions of side members 210 and 212. The ends of arms 242 bearing rollers 246 are resiliently urged downwardly into contact with cams 248 by springs 250 mounted on studs 252 on side walls 224 of the hopper. Studs 252 also serve to limit the movement of arms 242 and rollers 246 so that the latter do not engage the square forward ends of cams 248, but ride smoothly on the shaped upper surface thereof.

The other end of arms 242 are bent inwardly and downwardly and terminate in downwardly extending gripping portions 254 (Fig. 19) directly above and in position to engage the forwardmost part of flanges 229 where they extend forwardly beyond front wall 222 of hopper 220 as described above. When rollers 246 are brought into contact with cams 248 during the reciprocating motion of the hopper, the rollers ride up onto the cams, and gripping portions 254 of arms 242 are forced downwardly into gripping contact with flanges 229 against the urging of springs 250.

An erecting head 257, identical to erecting head 130 in the first described embodiment, is mounted adjacent the front portion of the machine.

A transverse shaft 258 is rotatably mounted in a pair of extensions 260 on front wall 222 of hopper 220. Shaft 258 carries a pair of upwardly and forwardly extending arms 262 terminating in a flat portion 264. The outer ends of shaft 258 carry a pair of rigidly mounted crank arms 266, each having a roller 268 rotatably mounted in a stud 270. A pair of upwardly extending plates 272 are rigidly fastened to the outer surface of side members 210 and 212 and extend upwardly into the path of rollers 268. A coiled spring 274 (Fig. 16) is mounted on shaft 258 between arms 262. One end of spring 274 is fixed to shaft 258 by means of a collar 276, and the other end is fixed to a stud 278 on extension 260. Spring 274 resiliently urges shaft 258 in a clockwise direction as viewed in Fig. 19, maintaining arms 262 in their normal position as shown in that figure. When rollers 268 engage plates 272 during the rearward motion of hopper 220, crank arms 266 and shaft 258 are rotated in a counterclockwise direction as viewed in Fig. 19 against the urging of spring 274. This moves arms 262 downwardly into substantial engagement with erecting head 257 as shown in Fig. 20.

In operation, a stack of collapsed cartons is placed in hopper 220. The operator then moves the hopper first forwardly and then backwardly by hand. On the forward motion of the hopper, the lowermost carton is brought over the erecting head 257. On the rearward motion, the projecting portion of center wall 36 of the collapsed carton catches on the upper fingers of the erecting head in a manner similar to that illustrated in Figs. 10 and 11 of the description of the first embodiment of this invention. Further rearward motion of the hopper causes roller 246 to roll up onto cam 248 causing arm 242 to rotate in a clockwise direction as viewed in Fig. 20 to grip the cover wall 40 of the carton between the end of arm 242 and flange 229. Continued rearward movement of the hopper pulls the carton against erecting head initiating the opening movement as described above in connection with the first embodiment of this machine. A pair of forwardly projecting arms 280 (Figs. 16 and 19) mounted on extensions 260 prevent upward bowing of the carton during this step.

Figures 19, 20, 21:
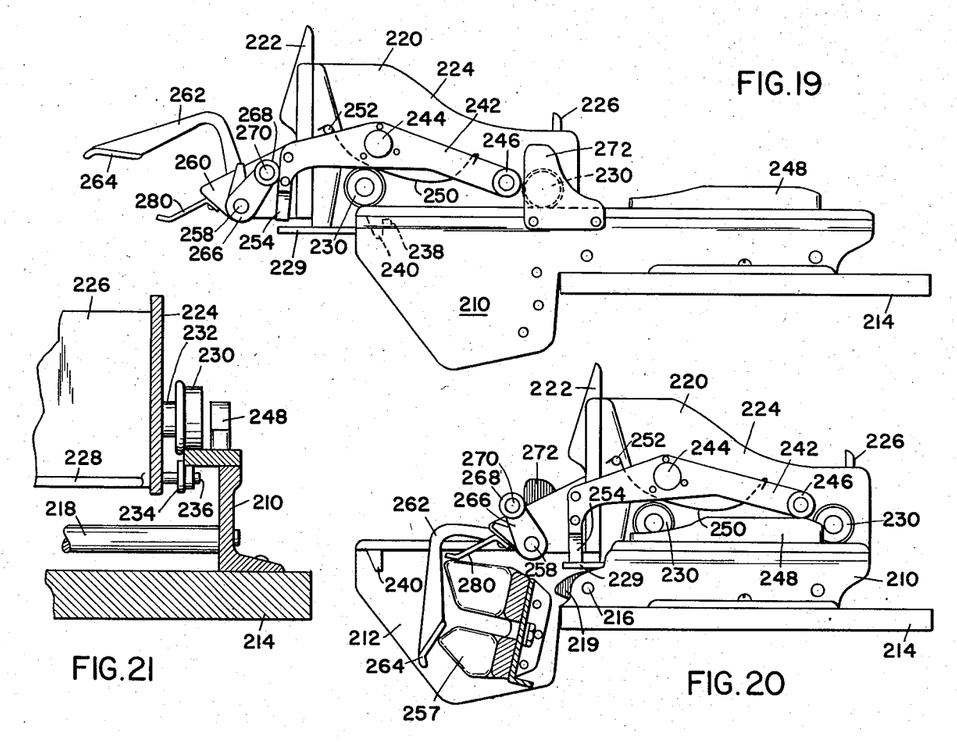
Fig. 19 is a side elevational view of the machine of Fig. 16.
Fig. 20 is a side elevational view partly in section of the machine of Fig. 16 showing the action of the parts during the erecting cycle.
Fig. 21 is an enlarged fragmentary cross sectional view taken substantially along lines 21—21 of Fig. 16.

Still further rearward movement brings rollers 268 in contact with plates 272 and causes shaft 258 to rotate in a counterclockwise direction as viewed in Figs. 19 and 20, causing arms 262 to move downwardly and rearwardly to the position shown in Fig. 20. This motion forces the carton against erecting head 257 and completes the erection thereof as described above. The hopper is now at the rearward limit of its motion. The operator then moves the hopper forwardly, and since the carton is still rigidly clamped to the hopper by means of arm 242, the carton is carried forwardly and is moved away from erecting head 257. At the same time, roller 268 moves away from plate 272 allowing arms 262 to swing upwardly and backwardly under the urging of spring 274, thereby allowing the carton to move forwardly, as described above. As the hopper approaches the forwardmost point of its travel, roller 246 rolls off cam 248 allowing arm 242 to return to its normal position under the urging of spring 250, releasing the carton from the hopper and the erected carton then falls off the machine under its own weight and a new erecting cycle begins.

It will thus be seen that the invention accomplishes its stated objects. The first described machine automatically maintains a supply of erected cartons available to the packers for filling. When the erected cartons are used, the machine automatically activates itself to erect another carton and thus, the packers are constantly provided with a supply of fresh cartons which is replenished as fast as it is used. The second embodiment herein described is a relatively simple, inexpensive hand-operated embodiment of this invention, suitable for quickly and economically erecting cartons for users whose volume is lower.

Each of the embodiments herein described is economical to manufacture and is simple and positive in operation. Each of them operates by means of a simple reciprocating straight line motion of the hopper, and each of them will completely erect and discharge a carton in a single motion.

While the invention has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A machine for setting up collapsible cartons of the type having front and rear walls hingedly attached to opposite sides of a bottom wall, and a top wall having tarnsverse members adapted to be swung downwardly for forming a plurality of cells, said machine comprising a frame, a hopper movably mounted on said frame for holding a supply of collapsed cartons, erecting means having a plurality of cam shaped surfaces projecting into the path of the bottommost carton in said hopper for engaging the same and withdrawing it from said hopper, means for gripping said carton and pulling the same against said erecting means for moving said front wall transversely to the plane of said carton for initiating the opening of the same, means for forcing said carton against said erecting means for moving said transverse members to erected position and completing the erection of said carton, and means for ejecitng said erected carton.

2. A machine for setting up collapsible cartons of the type having front and rear walls hingedly attached to opposite sides of a bottom wall, and a top wall having transverse members adapted to be swung downwardly for forming a plurality of cells, said machine comprising a frame means, a hopper movably mounted on said frame means for holding a supply of collapsed cartons, erecting means having a plurality of cam shaped surfaces projecting into the path of the bottommost carton in said hopper for engaging the same and withdrawing it from said hopper, means for gripping said carton and pulling the same against said erecting means for moving said front wall transversely to the plane of said carton for initiating the erection of the same, upwardly and forwardly extending pivotally mounted arms on said hopper, means for causing said arms to pivot downwardly and rearwardly to force said carton against said erecting means for moving said transverse members to erected position and completing the erection of said carton, and means for ejecting said erected carton.

3. A machine for setting up collapsible cartons of the type having front and rear walls hingedly attached to opposite sides of a bottom wall, and a top wall having transverse members adapted to be swung downwardly for forming a plurality of cells, said machine comprising a frame, a hopper mounted for reciprocal backward and forward motion on said frame, said hopper being adapted to hold a supply of collapsed cartons, erecting means having a plurality of cam shaped surfaces projecting into the path of the bottommost carton in said hopper for engaging the same and withdrawing it from said hopper, means on said hopper for gripping said carton and pulling the same against said erecting means for separating said front and rear walls for initiating the erection of said carton, arms pivotally mounted on said hopper, projecting parts connected to said arms, abutment means attached to said frame and extending into the path of said projecting parts for causing said arms to pivot during the backward movement of said hopper for forcing said carton against said erecting means for moving said transverse members to erected position and completing the erection of said carton, and means for ejecting said erected carton.

4. A machine for setting up collapsible cartons of the type having front and rear walls hingedly attached to opposite sides of a bottom wall, and a top wall having transverse members adapted to be swung downwardly for forming a plurality of cells, said machine comprising a frame, a hopper mounted for reciprocal backward and forward motion on said frame, said hopper being adapted to hold a supply of collapsed cartons, erecting means having a plurality of cam shaped surfaces projecting into the path of the bottommost carton in said hopper for engaging the same and withdrawing it from said hopper, means for gripping said carton and pulling the same against said erecting means for separating said front and rear walls for initiating the erection of said carton, a horizontal shaft rotatably mounted on said hopper, a pair of upwardly and forwardly extending arms rigidly mounted on said shaft, a projecting crank arm rigidly mounted on said shaft, abutment means mounted on said frame extending into the path of the ends of said crank arms, whereby the ends of said crank arms engage said abutment means during the backward movement of said hopper and cause said shaft and arms to rotate for forcing said carton against said erecting head for moving said transverse members to erected position and completing the election of said carton, and means for ejecting said erected carton.

5. A machine for setting up collapsible cartons of the type having front and rear walls hingedly attached to opposite sides of a bottom wall, and a top wall having transverse members adapted to be swung downwardly for forming a plurality of cells, said machine comprising a frame, a hopper mounted for reciprocal backward and forward motion on said frame, said hopper being adapted to hold a supply of collapsed cartons, erecting means having a plurality of cam shaped surfaces projecting into the path of the bottommost carton for engaging the same and withdrawing it from said hopper, a cam mounted on said frame, means movably mounted on said hopper and having a gripping part, a follower part on said movably mounted means engaging said cam for causing said gripping part to engage said carton during the backward movement of said hopper for pulling the same against said erecting means for separating said front and rear walls and initiating the erection of said carton, means for forcing said carton against said erecting means for moving said transverse members to erected position and completing the erection of said carton, and means for ejecting said erected carton.

6. A machine for setting up collapsible cartons of the type having front and rear walls hingedly attached to opposite sides of a bottom wall, and a top wall having transverse members adapted to be swung downwardly for forming a plurality of cells, said machine comprising a frame, a hopper mounted for reciprocal backward and forward motion of said frame, said hopper being adapted to hold a stack of collapsed cartons, erecting means having a plurality of cam shaped surfaces projecting into the path of the bottommost carton for engaging the same and withdrawing it from said hopper, a cam mounted on said frame, an arm pivotally mounted on said hopper and having a gripping part, follower means of said arm for engaging said cam for causing said arm to rotate during the backward movement of said hopper whereby said gripping part engages said carton and pulls the same against said erecting means for separating said front and rear walls for initiating the erection of said carton, upwardly and forwardly extending pivotally mounted arms on said hopper, means for causing said arms to pivot downwardly and backwardly to force said carton against said erecting means for moving said transverse members to erected position and completing the erection of said carton, and means for ejecting said erected carton.

7. A machine for setting up collapsible cartons of the type having front and rear walls hingedly attached to opposite sides of a bottom wall, and a top wall having transverse members adapted to be swung downwardly for forming a plurality of cells, said machine comprising a frame, a hopper mounted for reciprocal motion on said frame, said hopper being adapted to hold a stack of collapsed cartons, a flange mounted adjacent to the bottom of said hopper and projecting forwardly, erecting means having a plurality of cam shaped surfaces projecting into the path of the bottommost carton for engaging the same and withdrawing it from said hopper, a cam mounted on said frame, an arm pivotally mounted on said hopper and having a gripping part, follower means on said arm for engaging said cam for causing said arm to rotate during the rearward movement of said hopper whereby said gripping means clamps said carton against said flange for pulling the same against said erecting means for separating said front and rear walls for initiating the erection of said carton, upwardly and forwardly extending pivotally mounted arms on said hopper, means for causing said arms to pivot downwardly and backwardly to force said carton against said erecting means for moving said transverse members to erected position and completing the erection of said carton, and means for ejecting said erected carton.

8. A machine for setting up collapsible cartons of the type having front and rear walls hingedly attached to opposite sides of the bottom wall, and a top wall having transverse members and adapted to be swung downwardly for forming a plurality of cells, said machine comprising a frame, a hopper movably mounted on said frame for holding a stack of collapsed cartons, motor driven means for causing said hopper to move alternately forwardly and backwardly on said frame, erecting means having a plurality of cam shaped surfaces projecting into the path of the bottommost carton in said hopper for engaging the same and withdrawing it from said hopper, means for gripping said carton and pulling the same against said erecting means for separating said front and rear walls for initiating the erection of the same, means for forcing said carton against said erecting means for moving of said transverse members to erected position and completing the erection of said carton, and means for ejecting said erected carton.

9. A machine for setting up collapsible cartons of the type having front and rear walls hingedly attached to opposite sides of the bottom wall, and a top wall having transverse members and adapted to be swung downwardly for forming a plurality of cells, said machine comprising a frame, a hopper movably mounted on said frame for holding a stack of collapsed cartons, a pair of sprockets rotatably mounted on spaced shafts on said frame, endless chain means running on said sprockets, motor means for driving said endless chain means, abutment means fixed to said endless chain means and engaging said hopper to move the same in alternately forward and backward directions, erecting means having a plurality of cam shaped surfaces projecting into the path of the bottommost carton in said hopper for engaging the same and withdrawing it from said hopper, means for gripping said carton and pulling the same against said erecting means for separating said front and rear walls for initiating the opening of the same, means for forcing said carton against said erecting means for moving of said transverse members to erected position and completing the erection of said carton, and means for ejecting said erected carton.

10. A machine for setting up collapsible cartons of the type having front and rear walls hingedly attached to opposite sides of the bottom wall, and a top wall having transverse members and adapted to be swung downwardly for forming a plurality of cells, said machine comprising a frame, a hopper for holding a stack of collapsed cartons movably mounted on said frame, motor means for causing said hopper to move alternately forwardly and backwardly on said frame, erecting means having a plurality of cam shaped surfaces projecting into the path of the bottommost carton in said hopper for engaging the same and withdrawing the same from said hopper, means for gripping said carton and pulling the same against said erecting means for separating said front and rear walls for initiating the erection of the same, means for forcing said carton against said erecting means for moving said transverse members to erected position and completing the erection of said carton, means for holding an erected carton, and electrical switch means actuated by an erected carton in said holding means for de-energizing said motor means.

11. A machine for setting up collapsible cartons of the type having front and rear walls hingedly attached to opposite sides of the bottom wall, and a top wall having transverse members and adapted to be swung downwardly for forming a plurality of cells, said machine comprising a frame, a hopper for holding a stack of collapsed cartons movably mounted on said frame, motor means for causing said hopper to move alternately forwardly and backwardly on said frame, erecting means having a plurality of cam shaped surfaces projecting into the path of the bottommost carton in said hopper for engaging the same and withdrawing the same from said hopper, means for gripping said carton and pulling the same against said erecting means for separating said front and rear walls for initiating the erection of the same, means for forcing said carton against said erecting means for moving said transverse members to erected position and completing the erection of said carton, means for holding an erected carton, and first and second electrical switch means connected in parallel to said motor means, said first switch means being opened by an erected carton in said holding means, said second switch means being opened by said hopper when in its rearmost position, whereby said motor means is de-energized when said holding means contains an erected carton and said hopper is in its rearmost position.

References Cited in the file of this patent

UNITED STATES PATENTS

| | | |
|---|---|---|
| 2,479,994 | Annen | Aug. 23, 1949 |
| 2,572,800 | Corkhuff | Oct. 23, 1951 |
| 2,700,922 | Jordan | Feb. 1, 1955 |